(12) United States Patent
Zhou et al.

(10) Patent No.: US 8,298,971 B2
(45) Date of Patent: Oct. 30, 2012

(54) LOW TEMPERATURE CO-FIRED CERAMIC POWDER AND SPECIAL RAW MATERIAL AND USE THEREOF

(75) Inventors: Ji Zhou, Beijing (CN); Rui Wang, Beijing (CN); Hongjie Zhao, Beijing (CN)

(73) Assignee: Tsinghua University, Beijing (CN)

( * ) Notice: Subject to any disclaimer, the term of this patent is extended or adjusted under 35 U.S.C. 154(b) by 285 days.

(21) Appl. No.: 12/679,007

(22) PCT Filed: Nov. 4, 2008

(86) PCT No.: PCT/CN2008/001842
§ 371 (c)(1),
(2), (4) Date: Mar. 18, 2010

(87) PCT Pub. No.: WO2009/086724
PCT Pub. Date: Jul. 16, 2009

(65) Prior Publication Data
US 2010/0210446 A1 Aug. 19, 2010

(30) Foreign Application Priority Data
Jan. 11, 2008 (CN) .......................... 2008 1 0056019

(51) Int. Cl.
C03C 8/06 (2006.01)
C03C 6/04 (2006.01)
C03C 6/06 (2006.01)
C09K 17/40 (2006.01)
C04B 28/26 (2006.01)
C09D 1/00 (2006.01)

(52) U.S. Cl. ......... 501/25; 501/30; 501/31; 106/287.17; 106/287.34; 106/286.8

(58) Field of Classification Search .................. 501/21, 501/25, 30, 31, 151; 106/38.27, 38.9, 637, 106/286.8, 287.17, 287.34, 35
See application file for complete search history.

(56) References Cited

U.S. PATENT DOCUMENTS

| 4,735,925 | A | * | 4/1988 | Kato et al. | 501/107 |
| 5,260,476 | A | * | 11/1993 | Ohno et al. | 560/90 |
| 5,306,338 | A | * | 4/1994 | Tsunekawa | 106/35 |
| 6,107,229 | A | * | 8/2000 | Luck et al. | 501/151 |
| 6,660,194 | B1 | * | 12/2003 | Arita | 264/17 |

FOREIGN PATENT DOCUMENTS

| CN | 1153758 A | 7/1997 |
| CN | 101215157 A | 7/2008 |
| SU | 1418430 A | 8/1988 |

OTHER PUBLICATIONS

ISA Chinese Patent Office; International Search Report of PCT/CN2008/001842; Feb. 12, 2009; China, 6 pages.

* cited by examiner

Primary Examiner — Noah Wiese
(74) Attorney, Agent, or Firm — Alleman Hall McCoy Russell & Tuttle LLP

(57) ABSTRACT

The present invention relates to a ceramic powder and special raw material and use thereof. The raw material of the ceramic powder comprises 20-80 mass parts of $SiO_2$, 10-50 mass parts of $AlF_3$ and 0-30 mass parts of regulator. The raw material for preparing the ceramic powder is mixed and crushed, followed by melted into liquid glass at 1200-1400° C., quenched to obtain the ceramic powder. The low temperature co-fired ceramic powder has the following advantages: low sintering temperature (750-850° C.) and controllable sintering shrinkage rate; the dielectric constant of the ceramic block prepared with the ceramic powder is adjustable between 4.5 and 10 (1 MHz), the dielectric loss is less than 0.002, the mechanical strength is high and the preparation process is simple. The ceramic powder may be used for electric devices such as ceramic substrate, resonator, etc. as well as in other microelectronic packaging.

13 Claims, No Drawings

LOW TEMPERATURE CO-FIRED CERAMIC POWDER AND SPECIAL RAW MATERIAL AND USE THEREOF

CROSS-REFERENCE TO RELATED APPLICATIONS

This is the U.S. National Phase of International PCT Application Serial No. PCT/CN2008/001842, filed Nov. 4, 2008, which claims priority to Chinese Patent Application No. 200810056019.2, filed Jan. 11, 2008, which are hereby incorporated by reference in their entirety for all purposes.

FIELD OF THE INVENTION

The present invention relates to a low temperature co-fired ceramic powder and special raw material and use thereof.

BACKGROUND OF THE INVENTION

In recent years, with the rapid development of semiconductor technology, electronic components continuously develop toward minimization, integration and high frequency. Selecting appropriate ceramic material that can be low temperature co-fired with conductive materials such as silver and the like at no more than 900° C., and thus manufacturing multilayer components or plunging a passive component into a multilayer circuit substrate to make functional modules become a necessary requirement for the above trend. Low temperature co-fired ceramic as the major dielectric material of a passive integrated component has also becomes an important developmental trend.

Currently, low temperature co-fired ceramic (LTCC) facilitates densification of the materials mainly by using a liquid phase sintering mechanism after introducing an appropriate amount of sintering aids (low melting point oxide or low melting point glass) into the dielectric ceramic systems.

For example, adding $ZnO—B_2O_3—SiO_2$ glass, etc. into a $BaO—TiO_2—WO_3$ system can decrease a sintering temperature to 1000° C. (JP10294020-A), and adding $SiO_2—B_2O_3$ system glasses into a $CaZrO_3—SrTiO_3$ system can reduce the sintering temperature by 1000° C. However, the ability of the sintering aids to decrease the sintering temperature is limited, and excessive amount of sintering aids would also affect the performance of a device, such as increasing dielectric loss and the like. To obtain electronic ceramic materials with lower sintering temperature and easily controlled dielectric performance, the attention is focused on a ceramic material system in which the low temperature co-firing can be easily achieved, such as a Bi—Zn—Nb—O system (FR2845685-A1), Zr—Ti—Zn—O system (US2003116891-A1, US6762142-B2), $ZnNb_2O_6$ and $ZnTa_2O_6$ solid solution or $MgNb_2O_6$ and $MgTa_2O_6$ (US5756412-A, KR98001965A; KR99008479-A; KR203515-B1), Zn—Nb—O system (JP7169330-A), $ZnTiO_3$ (CN1773631, WO2005085154-A1), $(Ba_{1-x}Sr_x)_4LiNb_{3-y}Ta_yO_{12}$ (CN1793004), $BaNd_{2+x}Ti_5O_{14+1.5x}$ (CN1634800), Ba—Ti—Ge—Si (JP2000239061-A), $Li_{2+x}Nb_{3x}Ti_{1-4x}O_3$ (CN1821171 and CN1915904), $Zn_{(1-x)}Nb_2O_{6-x}TiO_2$ (KR29499/98), $Bi(Nb_{1-x}V_x)O_4$ (CN1793035), $Bi_3XZn_{2(1-x)}Nb_{2-x}O_7$ (CN1089247, CN1107128), $(Bi_{3x}Zn_{2-3x})(Zn_{x-y/3}Nb_{2-x-2y/3}Ma_y)O_7$ and $(Bi_{3x}Zn_{2-3x})(Zn_xNb_{2-x-y}Mb_y)O_7$, wherein Ma=$Sn^{4+}$, $Zr^{4+}$, Mb=$Sb^{5+}$, $Ta^{5+}$, $Mo^{5+}$(CN1431166), $(Bi_{3x}M_{2-3x})(Zn_xNb_{2-x})O_7$, wherein M is $Zn^{2+}$, $Ca^{2+}$, or $Cd^{2+}$, or $Sr^{2+}$ (CN1792999) and the like. The sintering temperatures of these material systems themselves are low, generally between 950 and 1150° C. The low temperature sintering at about 900° C. can be achieved by mixing in a small amount of glass or low melting point oxide (such as $Bi_2O_3$, ZnO, CuO, $V_2O_5$ and the like).

However, introducing a low melting point regulator may cause a series of problems, such as reduced mechanical strength of the material after being sintered, or higher dielectric loss as well as complexity of the process. Therefore, it is very necessary to develop low temperature co-fired ceramic having simple components.

DISCLOSURE OF THE INVENTION

The objective of the present invention is to provide a low temperature co-fired ceramic powder and special raw materials therefore, and a method for preparing the same.

The raw materials for preparing the low temperature co-fired ceramic powder provided in the present invention, is comprised of: 20-80 mass parts of $SiO_2$ and 10-50 mass parts of $AlF_3$; wherein the mass parts of $AlF_3$ is calculated based on the mass parts of anhydrous $AlF_3$.

Certainly, its composition may also only consist of $SiO_2$ and $AlF_3$.

Both anhydrous $AlF_3$ and $AlF_3$ with crystal water can be used.

Anhydrous $AlF_3$ may be available commercially. When the $AlF_3$ is $AlF_3$ with crystal water, the anhydrous $AlF_3$ may be obtained as follows: under a protection atmosphere of $NH_4F$, analytically pure $AlF_3 \cdot 3H_2O$ is calcined at 450-550° C. for 1-2 hours to obtain anhydrous $AlF_3$. Preparing the anhydrous $AlF_3$ according to this method can largely reduce the cost of producing the low temperature co-fired ceramic powder.

The composition of the raw materials also comprises more than zero and less than or equal to 30 mass parts of a regulator; the regulator is at least one of metal fluoride and metal oxide.

Specifically, the regulator may be at least one of $BaF_2$, $CaF_2$, CaO, MgO, $Al_2O_3$, $MgF_2$, LiF and NaF.

The method for preparing a fluorine-doped Si—Al glass based low temperature co-fired ceramic powder provided in the present invention is to mix and crush the mixture of anhydrous $AlF_3$ and $SiO_2$, melt the mixture into liquid glass at 1200-1400° C., and then quench to obtain the ceramic powder.

The mixing and crushing of the mixture may be carried out by the following procedure: ethanol is added into the mixture at 1.5-2.0 times the amount of the mixture weight, and the mixture is ball milled for 1-48 hours, preferably 15-30 hours.

The method also includes the following steps: passing the resultant ceramic powder through an 80 mesh screen after being crashed, followed by adding ethanol or water in 1.5-2.5 times the amount of ceramic powder mass, ball milling for 24-48 hours and drying.

The mixture also includes a regulator, and the mass part of the regulator is greater than zero and less than or equal to 30; and the regulator is at least one of metal fluoride and metal oxide.

Specifically, the regulator may be at least one of $BaF_2$, $CaF_2$, CaO, MgO, $Al_2O_3$, $MgF_2$, LiF and NaF.

The ceramic powder prepared using the method for preparing the fluorine-doped Si—Al glass based low temperature co-fired ceramic powder provided in the present invention also belongs to the content protected by the present invention.

The ceramic powder described in the present invention may be used for preparing ceramic and electronic device such as low temperature co-fired ceramic substrate, resonator and the like, and may also be applied in the field of microelectronics packaging.

For example, the ceramic may be prepared as follows: mixing the ceramic powder provided in the present invention and an adhesive to prepare a pressed piece, then sintering at 750-850° C. for 2-4 hours to obtain the ceramic.

The adhesive specifically may be polyvinyl alcohol or other commonly used adhesives.

By changing the component ratio of the ceramic powder raw material to improve and control the sintering shrinkage rate of the ceramic powder and to improve the performance of ceramic block prepared with the ceramic powder, such as dielectric constant, strength, and coefficient of thermal expansion, the present invention can achieve LTCC process better. The system material (ceramic powder) may be used for LTCC substrate materials or other packaging materials.

BEST EMBODIMENTS OF THE INVENTION

Unless specifically stated, the experimental methods in the following examples are conventional methods.

Example 1

Preparation of Ceramic Powder and Ceramic

1) Calcining $AlF_3 \cdot 3H_2O$ at 450° C. for 1 hour under the protection atmosphere of $NH_4F$ to remove the crystal water and obtain anhydrous $AlF_3$.

2) Weighing each component according to the following compositions:

| | |
|---|---|
| $SiO_2$: | 55 g |
| anhydrous $AlF_3$: | 35 g |

The above mixed powder materials are placed in a ball mill jar and anhydrous ethanol is added in about 2 times the amount of total weight of the mixture materials. The mixture is dried in an oven (68° C.) after being ball milled for 24 hours. The resultant mixed powder is melted into liquid glass at 1400° C., quenched, and passed through an 80 mesh screen after being dried and crushed. Then, the resultant glass powder is placed in the ball mill jar again and the water (about 2 times the amount of the glass powder weight) is added. The fluorine-doped Si—Al glass based ceramic material is obtained after being ball milled for 24 hours and dried.

Using conventional ceramic preparation process, polyvinyl alcohol PVA (its mass percent content: 10% and its average polymerization degree: 1750±50) is added into the ceramic raw material prepared in step 2), as an adhesive. After being made into particles, the pressed piece are prepared according to conventional methods and sintered at 850° C. for 2 hours. The sintered microcrystal glass pieces are coated with silver. The performance is tested after burning off the silver.

The performances of this group of microcrystal glass are as follows:

Dielectric constant and dielectric loss are measured using an HP 4278A impedance analyzer. The radial shrinkage rate of the samples is obtained by directly measuring the diameters of the samples before or after being sintered. The density of the samples is measured using Archimedes water displacement method. The coefficient of thermal expansion is measured using a NETZSCH DIL 402 PC thermal analyzer.

The dielectric constant $\in_r$ (1 MHz) of the sample is detected to be 4.5, the dielectric loss tan δ (1 MHz) is 0.0017, the radial shrinkage rate is 12.0%, the density is 2.65 g/cm³, the coefficient of thermal expansion (20-200° C.) is 7.5 ppm/° C. and three-point bending strength is 120 MPa.

Example 2

Preparation of Ceramic Powder and Ceramic

1) Calcining $AlF_3 \cdot 3H_2O$ at 500° C. for 1 hour under the protection atmosphere of $NH_4F$ to remove the crystal water and obtain anhydrous $AlF_3$.

2) Weighing each component according to the following composition:

| | |
|---|---|
| $SiO_2$: | 50 g |
| anhydrous $AlF_3$: | 30 g |
| regulator: $CaF_2$ | 15 g |

The above mixed powder materials are placed in a ball milling jar and anhydrous ethanol is added in about 1.5 times the amount of total weight of mixture materials. The mixture is dried in an oven (68° C.) after being ball milled for 24 hours. The resultant mixed powder is melted into liquid glass at 1200° C., quenched, and passed through an 80 mesh screen after being dried and crushed. Then the resultant glass powder is placed in the ball milling jar again and the water is added (about 2.5 times the amount of the glass powder weight). The fluorine-doped Si—Al glass based ceramic material is obtained after being ball milled for 24 hours and dried.

Using conventional ceramic preparation process, polyvinyl alcohol PVA (mass percent content: 5%, and average polymerization degree: 1750±50) is added into the ceramic material prepared in step 2), as an adhesive. After being made into particles, the pressed piece are prepared according to conventional methods and sintered at 800° C. for 2 hours. The sintered microcrystal glass pieces are coated with silver. The performance is tested after burning off the silver.

The performances of this group of microcrystal glass are as follows:

Dielectric constant and dielectric loss are measured using HP 4278A impedance analyzers. The radial shrinkage rate is obtained by directly measuring the diameters of the samples before or after being sintered. The density of the sample is measured using Archimedes water displacement method and the coefficient of thermal expansion is measured using a NETZSCH DIL 402 PC thermal analyzer.

The dielectric constant $\in_r$ (1 MHz) of the sample is detected to be 5.0, the dielectric loss tan δ (1 MHz) is 0.0015, the radial shrinkage rate is 16.8%, the density is 2.70 g/cm³, the coefficient of thermal expansion (20-200° C.) is 8.0 ppm/° C. and three-point bending strength is 190 MPa.

Example 3

Preparation of Ceramic Powder and Ceramic

1) Calcining $AlF_3 \cdot 3H_2O$ at 500° C. for 1 hour under protection atmosphere of $NH_4F$ to remove the crystal water and obtain anhydrous $AlF_3$.

2) Weighing each component according to the following composition:

| | |
|---|---|
| SiO₂: | 60 g |
| anhydrous AlF₃: | 15 g |
| regulators: | BaF₂ 5 g, CaF₂ 5 g and MgO 10 g |

The above mixed powder materials are placed in a ball milling jar and anhydrous ethanol (about 2 times the amount of total weight of mixture materials) is added. The mixture is dried in an oven (68° C.) after being ball milled for 24 hours. The resultant mixed powder is melted into liquid glass at 1400° C., quenched, and passed through an 80 mesh screen after being dried and crushed. Then the resultant glass powder is placed in the ball milling jar again and the water (about 1.5 times the amount of the glass powder weight) is added. The fluorine-doped Si—Al glass based ceramic material is obtained after being ball milled for 48 hours and dried.

Using conventional ceramic preparation process, polyvinyl alcohol PVA (its mass percent content: 10%, and its average polymerization degree: 1750±50) is added into the ceramic material prepared in step 2), as an adhesive. After being made into particles, the pressed pieces are prepared according to conventional methods and sintered at 850° C. for 2 hours. The sintered microcrystal glass pieces are coated with silver. The performance is tested after burning off the silver.

The performances of this group of microcrystal glass are as follows:

Dielectric constant and dielectric loss are measured using HP 4278A impedance analyzers. The radial shrinkage rate is obtained by directly measuring the diameters of the samples before or after being sintered. The density of the sample is measured using Archimedes water displacement method and the coefficient of thermal expansion is measured using a NETZSCH DIL 402 PC thermal analyzer.

The dielectric constant $\in_r$ (1 MHz) of the sample is detected to be 6.5, the dielectric loss tan δ (1 MHz) is 0.0007, the radial shrinkage rate is 14.0%, the density is 2.68 g/cm³, the coefficient of thermal expansion (CTE)(20-200° C.) is 8.3 ppm/° C. and three-point bending strength is 174 MPa.

Example 4

Preparation of Ceramic Powder and Ceramic

1) Calcining AlF₃.3H₂O at 550° C. for 2 hours under protection atmosphere of NH₄F to remove the crystal water and obtain anhydrous AlF₃.
2) Weighing each component according to the following composition:

| | |
|---|---|
| SiO₂: | 50 g |
| anhydrous AlF₃: | 40 g |
| regulators: | MgF₂ 10 g, CaO 3 g and NaF 2 g |

The above mixed powder materials are placed in a ball milling jar and anhydrous ethanol (about 2.5 times the amount of total weight of mixture materials) is added. The mixture is dried in an oven (68° C.) after being ball milled for 24 hours. The resultant mixed powder is melted into liquid glass at 1350° C., quenched, and passed through an 80 mesh screen after being dried and crushed. Then the resultant glass powder is placed in the ball milling jar again and the water (about 2.5 times the amount of the glass powder weight) is added. The fluorine-doped Si—Al glass based ceramic material is obtained after being ball milled for 40 hours and dried.

Using conventional ceramic preparation process, polyvinyl alcohol PVA (its mass percent content: 10%, and its average polymerization degree: 1750±50) is added into the above fluorine-doped Si—Al glass based ceramic material as an adhesive. After being made into particles, the pressed pieces are prepared according to conventional methods and sintered at 850° C. for 4 hours. The sintered microcrystal glass pieces are coated with silver. The performance is tested after burning off the silver.

The performances of this group of microcrystal glass are as follows:

Dielectric constant and dielectric loss are measured using HP 4278A impedance analyzers. The radial shrinkage rate is obtained by directly measuring the diameters of the samples before or after being sintered. The density of the sample is measured using Archimedes water displacement method and the coefficient of thermal expansion is measured using a NETZSCH DIL 402 PC thermal analyzer.

The dielectric constant $\in_r$ (1 MHz) of the sample is detected to be 5.8, the dielectric loss tan δ (1 MHz) is 0.0014, the radial shrinkage rate is 17.0%, the density is 2.60 g/cm³, the coefficient of thermal expansion (CTE)(20-200° C.) is 6.0 ppm/° C., and three-point bending strength is 150 MPa.

Example 5

Preparation of Ceramic Powder and Ceramic

1) Calcining AlF₃.3H₂O at 500° C. for 1.5 hours under protection atmosphere of NH₄F to remove the crystal water and obtain anhydrous AlF₃.
2) Weighing each component according to the following composition:

| | |
|---|---|
| SiO₂: | 40 g |
| anhydrous AlF₃: | 40 g |
| regulators: | BaF₂ 20 g and CaF₂ 5 g |

The above mixed powder materials are placed in a ball milling jar and anhydrous ethanol (about 2 times the amount of total weight of mixture materials) is added. The mixture is dried in an oven (68° C.) after being ball milled for 24 hours. The resultant mixed powder is melted into liquid glass at 1350° C., quenched, and passed through an 80 mesh screen after being dried and crushed. Then the resultant glass powder is placed in the ball milling jar again and the water (about 1.5 times the amount of the glass powder weight) is added. The fluorine-doped Si—Al glass based ceramic material is obtained after being ball milled for 48 hours and dried.

Using conventional ceramic preparation process, polyvinyl alcohol PVA (its mass percent content: 10%, and its average polymerization degree: 1750±50) is added into the above fluorine-doped Si—Al glass based ceramic material as an adhesive. After being made into particles, the pressed pieces are prepared according to conventional methods and sintered at 750° C. for 3 hours. The sintered microcrystal glass pieces are coated with silver. The performance is tested after burning off the silver.

The performances of this group of microcrystal glass are as follows:

Dielectric constant and dielectric loss are measured using HP 4278A impedance analyzers. The radial shrinkage rate is obtained by directly measuring the diameters of the samples before or after being sintered. The density of the sample is measured using Archimedes water displacement method and the coefficient of thermal expansion is measured using a NETZSCH DIL 402 PC thermal analyzer.

The dielectric constant $\in_r$ (1 MHz) of the sample is detected to be 7.3, the dielectric loss tan δ (1 MHz) is 0.0008, the radial shrinkage rate is 15.0%, the density is 2.80 g/cm$^3$, the coefficient of thermal expansion (CTE)(20-200° C.) is 5.5 ppm/° C., and three-point bending strength is 226 MPa.

Example 6

Preparation of Ceramic Powder and Ceramic

1) Calcining AlF$_3$.3H$_2$O at 500° C. for 1.5 hour under protection atmosphere of NH$_4$F to remove the crystal water and obtain anhydrous AlF$_3$.
2) Weighing each component according to the following composition:

| | |
|---|---|
| SiO$_2$: | 40 g |
| anhydrous AlF$_3$: | 30 g |
| regulators: | BaF$_2$ 5 g, CaF$_2$ 20 g and Al$_2$O$_3$ 5 g |

The above mixed powder materials are placed in a ball milling jar and anhydrous ethanol (about 2 times the amount of total weight of mixture materials) is added. The mixture is dried in an oven (68° C.) after being ball milled for 24 hours. The resultant mixed powder is melted into liquid glass at 1250° C., quenched, and passed through an 80 mesh screen after being dried and crushed. Then the resultant glass powder is placed in the ball milling jar again and the water (about 2 times the amount of the glass powder weight) is added. The fluorine-doped Si—Al glass based ceramic material is obtained after being ball milled for 30 hours and dried.

Using conventional ceramic preparation process, polyvinyl alcohol PVA (its mass percent content: 5%, and its average polymerization degree: 1750±50) is added into the above fluorine-doped Si—Al glass based ceramic material as an adhesive. After being made into particles, the pressed pieces are prepared according to conventional methods and sintered at 800° C. for 3 hours. The sintered microcrystal glass pieces are coated with silver. The performance is tested after burning off the silver.

The performances of this group of microcrystal glass are as follows:

Dielectric constant and dielectric loss are measured using HP 4278A impedance analyzers. The radial shrinkage rate is obtained by directly measuring the diameters of the samples before or after being sintered. The density of the sample is measured using Archimedes water displacement method and the coefficient of thermal expansion is measured using a NETZSCH DIL 402 PC thermal analyzer.

The dielectric constant $\in_r$ (1 MHz) of the sample is detected to be 8.5, the dielectric loss tan δ (1 MHz) is 0.0019, the radial shrinkage rate is 16.5%, the density is 2.85 g/cm$^3$, the coefficient of thermal expansion (CTE)(20-200° C.) is 6.5 ppm/° C., and three-point bending strength is 250 MPa.

Example 7

Preparation of Ceramic Powder and Ceramic

1) Calcining AlF$_3$.3H$_2$O at 450° C. for 2 hour under protection atmosphere of NH$_4$F to remove the crystal water and obtain anhydrous AlF$_3$.
2) Weighing each component according to the following composition:

| | |
|---|---|
| SiO$_2$: | 35 g |
| anhydrous AlF$_3$: | 35 g |
| regulators: | MgO 5 g, CaF$_2$ 15 g and CaO 10 g |

The above mixed powder materials are placed in a ball milling jar and anhydrous ethanol (about 1.5 times the amount of total weight of mixture materials) is added. The mixture is dried in an oven (68° C.) after being ball milled for 24 hours. The resultant mixed powder is melted into liquid glass at 1250° C., quenched, and passed through an 80 mesh screen after being dried and crushed. Then the resultant glass powder is placed in the ball milling jar again and the water (about 2 times the amount of the glass powder weight) is added. The fluorine-doped Si—Al glass based ceramic material is obtained after being ball milled for 36 hours and dried.

Using conventional ceramic preparation process, polyvinyl alcohol PVA (its mass percent content: 7%, and its average polymerization degree: 1750±50) is added into the above fluorine-doped Si—Al glass based ceramic material as an adhesive. After being made into particles, the pressed pieces are prepared according to conventional methods and sintered at 850° C. for 2 hours. The sintered microcrystal glass pieces are coated with silver. The performance is tested after burning off the silver.

The performances of this group of microcrystal glass are as follows:

Dielectric constant and dielectric loss are measured using HP 4278A impedance analyzers. The radial shrinkage rate is obtained by directly measuring the diameters of the samples before or after being sintered. The density of the sample is measured using Archimedes water displacement method and the coefficient of thermal expansion is measured using a NETZSCH DIL 402 PC thermal analyzer.

The dielectric constant $\in_r$ (1 MHz) of the sample is detected to be 10.0, the dielectric loss tan δ (1 MHz) is 0.0010, the radial shrinkage rate is 15.5%, the density is 2.75 g/cm$^3$, the coefficient of thermal expansion (CTE)(20-200° C.) is 8.5 ppm/° C., and three-point bending strength is 200 MPa.

Example 8

Preparation of Ceramic Powder and Ceramic

1) Calcining AlF$_3$.3H$_2$O at 450° C. for 1 hour under protection atmosphere of NH$_4$F to remove the crystal water and obtain anhydrous AlF$_3$.
2) Weighing each component according to the following composition:

| | |
|---|---|
| SiO$_2$: | 20 g |
| anhydrous AlF$_3$: | 50 g |
| regulators: | Al$_2$O$_3$ 15 g, LiF 3 g and MgF$_2$ 12 g |

The above mixed powder materials are placed in a ball milling jar and anhydrous ethanol (about 1.5 times the amount of total weight of mixture materials) is added. The mixture is dried in an oven (68° C.) after being ball milled for 12 hours. The resultant mixed powder is melted into liquid glass at 1200° C., quenched, and passed through an 80 mesh screen after being dried and crushed. Then the resultant glass powder is placed in the ball milling jar again and the water (about 1.5 times the amount of the glass powder weight) is added. The fluorine-doped Si—Al glass based ceramic material is obtained after being ball milled for 45 hours and dried.

Using conventional ceramic preparation process, polyvinyl alcohol PVA (its mass percent content: 8%, and its average polymerization degree: 1750±50) is added into the above fluorine-doped Si—Al glass based ceramic material as an adhesive. After being made into particles, the pressed pieces are prepared according to conventional methods and sintered at 825° C. for 2 hours. The sintered microcrystal glass pieces are coated with silver. The performance is tested after burning off the silver.

The performances of this group of microcrystal glass are as follows:

Dielectric constant and dielectric loss are measured using HP 4278A impedance analyzers. Radial shrinkage rate is obtained by directly measuring the diameters of the samples before or after being sintered. The density of the sample is measured using Archimedes water displacement method and the coefficient of thermal expansion is measured using a NETZSCH DIL 402 PC thermal analyzer.

The dielectric constant $\in_r$ (1 MHz) of the sample is detected to be 7.0, the dielectric loss tan δ (1 MHz) is 0.0011, the radial shrinkage rate is 16.5%, the density is 2.77 g/cm$^3$, the coefficient of thermal expansion (CTE)(20-200° C.) is 7.5 ppm/° C., and three-point bending strength is 180 MPa.

Example 9

Preparation of Ceramic Powder and Ceramic

1) Calcining AlF$_3$.3H$_2$O at 500° C. for 1.5 hours under protection atmosphere of NH$_4$F to remove the crystal water and obtain anhydrous AlF$_3$.

2) Weighing each component according to the following composition:

| | |
|---|---|
| SiO$_2$: | 80 g |
| anhydrous AlF$_3$: | 10 g |
| regulators: | LiF 5 g and CaF$_2$ 10 g |

The above mixed powder materials are placed in a ball milling jar and anhydrous ethanol (about 1.5 times the amount of total weight of mixture materials) is added. The mixture is dried in an oven (68° C.) after being ball milled for 20 hours. The resultant mixed powder is melted into liquid glass at 1400° C., quenched, and passed through an 80 mesh screen after being dried and crushed. Then the resultant glass powder is placed in the ball milling jar again and the water (about 2.0 times the amount of the glass powder weight) is added. The fluorine-doped Si—Al glass based ceramic material is obtained after being ball milled for 36 hours and dried.

Using conventional ceramic preparation process, polyvinyl alcohol PVA (its mass percent content: 5%, and its average polymerization degree: 1750±50) is added into the above fluorine-doped Si—Al glass based ceramic material as an adhesive. After being made into particles, the pressed pieces are prepared according to conventional methods and sintered at 850° C. for 3 hours. The sintered microcrystal glass pieces are coated with silver. The performance is tested after burning off the silver.

The performances of this group of microcrystal glass are as follows:

Dielectric constant and dielectric loss are measured using HP 4278A impedance analyzers. Radial shrinkage rate is obtained by directly measuring the diameters of the samples before or after being sintered. The density of the sample is measured using Archimedes water displacement method and the coefficient of thermal expansion is measured using a NETZSCH DIL 402 PC thermal analyzer.

The dielectric constant $\in_r$ (1 MHz) of the sample is detected to be 4.9, the dielectric loss tan δ (1 MHz) is 0.0016, the radial shrinkage rate is 17.5%, the density is 2.67 g/cm$^3$, the coefficient of thermal expansion (CTE)(20-200° C.) is 5.0 ppm/° C., and three-point bending strength is 120 MPa.

INDUSTRIAL APPLICATION

The present invention provides a low temperature co-fired ceramic powder and special raw material and use thereof. The ceramic powder provided in the present invention has the following advantages over the prior art:

The sintering temperature is low. By changing the ratio of each component in the ceramic powder material, the sintering temperature is between 750-850° C. with no protection atmosphere.

The dielectric constant sintering shrinkage rate of the sintered ceramic is controllable and the dielectric loss is low. By controlling the composition ratio of the components in the system and controlling the amount of the crystalline phase during sintering, the sintering shrinkage rate is controlled between 10% and 20%, and the dielectric constant range between 4.5 and 10 (1 MHz); also lower dielectric loss factors may be achieved during the change of the composition ratio of the system.

The cost is low. The cost is largely reduced by using thermally treated AlF$_3$.3H$_2$O substituted for commercial anhydrous AlF$_3$, and the cost of other materials is also lower.

The strength and thermo-physical properties of ceramic block prepared by the ceramic powder are suitable. The three-point bending strength is 100-250 MPa, and the coefficient of thermal expansion is between 5 and 9 ppm/° C. (20-200° C.), which is numerically close to the coefficient of thermal expansion of GaAs chip.

The preparation process is simple. Using the conventional glass melting method and the method of preparing microcrystal glass, the prepared ceramic powder may be directly sintered into ceramic or other materials after combining with an adhesive.

The low temperature co-fired ceramic powder of the present invention may be used for electronic devices such as LTCC substrate, resonator and the like, as well as in the other field of microelectronics packaging.

The invention claimed is:

1. A raw material used for preparing ceramic powder, comprising:
    20-80 mass parts of SiO$_2$, 10-50 mass parts of AlF$_3$, and 15-30 mass parts of a regulator selected from the group consisting of one or more of BaF$_2$, CaF$_2$, MgO, Al$_2$O$_3$, MgF$_2$, LiF, and NaF, wherein the mass parts of AlF$_3$ are calculated based on anhydrous AlF$_3$.

2. A method for preparing a ceramic powder, the ceramic powder comprising 20-80 mass parts of SiO$_2$, 10-50 mass parts of AlF$_3$, and 15-30 mass parts of a regulator selected from the group consisting of one or more of BaF$_2$, CaF$_2$, MgO, Al$_2$O$_3$, MgF$_2$, LiF, and NaF, wherein the mass parts of AlF$_3$ are calculated based on anhydrous AlF$_3$, the method comprising:

mixing and crushing a mixture of 10-50 mass parts of anhydrous $AlF_3$, 20-80 mass parts of $SiO_2$ and 15-30 mass parts of the regulator;

melting the mixture into liquid glass at 1200-1400° C.; and quenching the mixture to obtain the ceramic powder.

3. The method according to claim 2, wherein the anhydrous $AlF_3$ is prepared by calcination of analytically pure $AlF_3.3H_2O$ at 450-550° C. for 1-2 hours under an atmosphere of $NH_4F$.

4. The method according to claim 2, wherein mixing and crushing the mixture includes adding to the mixture ethanol in an amount that is 1.5-2.5 times an amount by weight of the mixture into the mixture, and ball milling for 1-48 hours.

5. The method according to claim 3, wherein mixing and crushing the mixture includes adding to the mixture ethanol in an amount that is 1.5-2.5 times an amount by weight of the mixture into the mixture, and ball milling for 1-48 hours.

6. The method according to claim 2, wherein the method further comprises passing the ceramic powder through an 80 mesh screen, followed by adding ethanol or water in an amount that is 1.5-2.5 times an amount by weight of the ceramic powder, and ball milling for 24-48 hours and drying.

7. The method according to claim 3, wherein the method further comprises passing the ceramic powder through an 80 mesh screen, followed by adding ethanol or water in an amount that is 1.5-2.5 times an amount by weight of the ceramic powder, and ball milling for 24-48 hours and drying.

8. The method according to claim 4, wherein the method further comprises passing the ceramic powder through an 80 mesh screen, followed by adding ethanol or water in an amount that is 1.5-2.5 times an amount by weight of the ceramic powder, and ball milling for 24-48 hours and drying.

9. A ceramic powder made by a process for preparing ceramic powder, the ceramic powder comprising 20-80 mass parts of $SiO_2$, 10-50 mass parts of $AlF_3$, and 15-30 mass parts of a regulator selected from the group consisting of one or more of $BaF_2$, $CaF_2$, MgO, $Al_2O_3$, $MgF_2$, LiF, and NaF, wherein the mass parts of $AlF_3$ are calculated based on anhydrous $AlF_3$, the process comprising:

mixing and crushing a mixture of 10-50 mass parts of anhydrous $AlF_3$, 20-80 mass parts of $SiO_2$, and 15-30 mass parts of the regulator;

melting the mixture into liquid glass at 1200-1400° C.; and quenching the mixture to obtain the ceramic powder.

10. The ceramic powder of claim 9, wherein the anhydrous $AlF_3$ is prepared by calcination of analytically pure $AlF_3.3H_2O$ at 450-550° C. for 1-2 hours under an atmosphere of $NH_4F$.

11. The ceramic powder of claim 9, wherein mixing and crushing the mixture includes adding ethanol in an amount that is 1.5-2.5 times an amount by weight of the mixture into the mixture, and ball milling for 1-48 hours.

12. The ceramic powder of claim 9, wherein the method further comprises passing the ceramic powder through an 80 mesh screen, followed by adding ethanol or water in an amount that is 1.5-2.5 times an amount by weight of the ceramic powder, and ball milling for 24-48 hours and drying.

13. A method of using a ceramic powder comprising 20-80 mass parts of $SiO_2$, 10-50 mass parts of $AlF_3$, and 15-30 mass parts of a regulator selected from the group consisting of one or more of $BaF_2$, $CaF_2$, MgO, $Al_2O_3$, $MgF_2$, LiF, and NaF, wherein the mass parts of $AlF_3$ are calculated based on anhydrous $AlF_3$, and wherein the ceramic powder is made by the steps of mixing and crushing a mixture of 10-50 mass parts of anhydrous $AlF_3$, 20-80 mass parts of $SiO_2$, and 15-30 mass parts of the regulator; melting the mixture into liquid glass at 1200-1400° C.; and quenching the mixture to obtain the ceramic powder, the method comprising:

using the ceramic powder in preparing one or more of a ceramic device and an electronic device.

\* \* \* \* \*